United States Patent [19]

Dombroski

[11] 3,942,813

[45] Mar. 9, 1976

[54] APPARATUS FOR FACILITATING MOVEMENT OF FURNITURE

[76] Inventor: Bernard F. Dombroski, P.O. Box 164, Rte. 520, Marlboro, N.J. 07746

[22] Filed: Feb. 12, 1975

[21] Appl. No.: 549,202

[52] U.S. Cl. ................... 280/47.13 R; 280/47.15
[51] Int. Cl.² .................................. B62B 1/10
[58] Field of Search ............ 280/47.13 R, 47.15, 46, 280/79.1

[56] References Cited
UNITED STATES PATENTS

| | | |
|---|---|---|
| 760,708 | 5/1904 | Sharp .............................. 280/47.15 |
| 843,671 | 2/1907 | Fetzer .............................. 280/47.15 |
| 1,135,603 | 4/1915 | Mead .................................. 280/46 |
| 1,604,723 | 10/1926 | Rutherford ................... 280/47.13 R |
| 2,305,284 | 12/1942 | Trabant ........................ 280/47.13 R |
| 3,015,494 | 1/1962 | Fosbrook, Sr. .............. 280/47.15 X |

*Primary Examiner*—Philip Goodman
*Assistant Examiner*—Michael J. Forman

[57] ABSTRACT

A wheeled device for attachment to furniture legs. The device has a lifting surface in a channel which fits under a horizontal furniture leg crosspiece and which upon rotation of the wheels under the crosspiece elevates the furniture leg(s).

3 Claims, 4 Drawing Figures

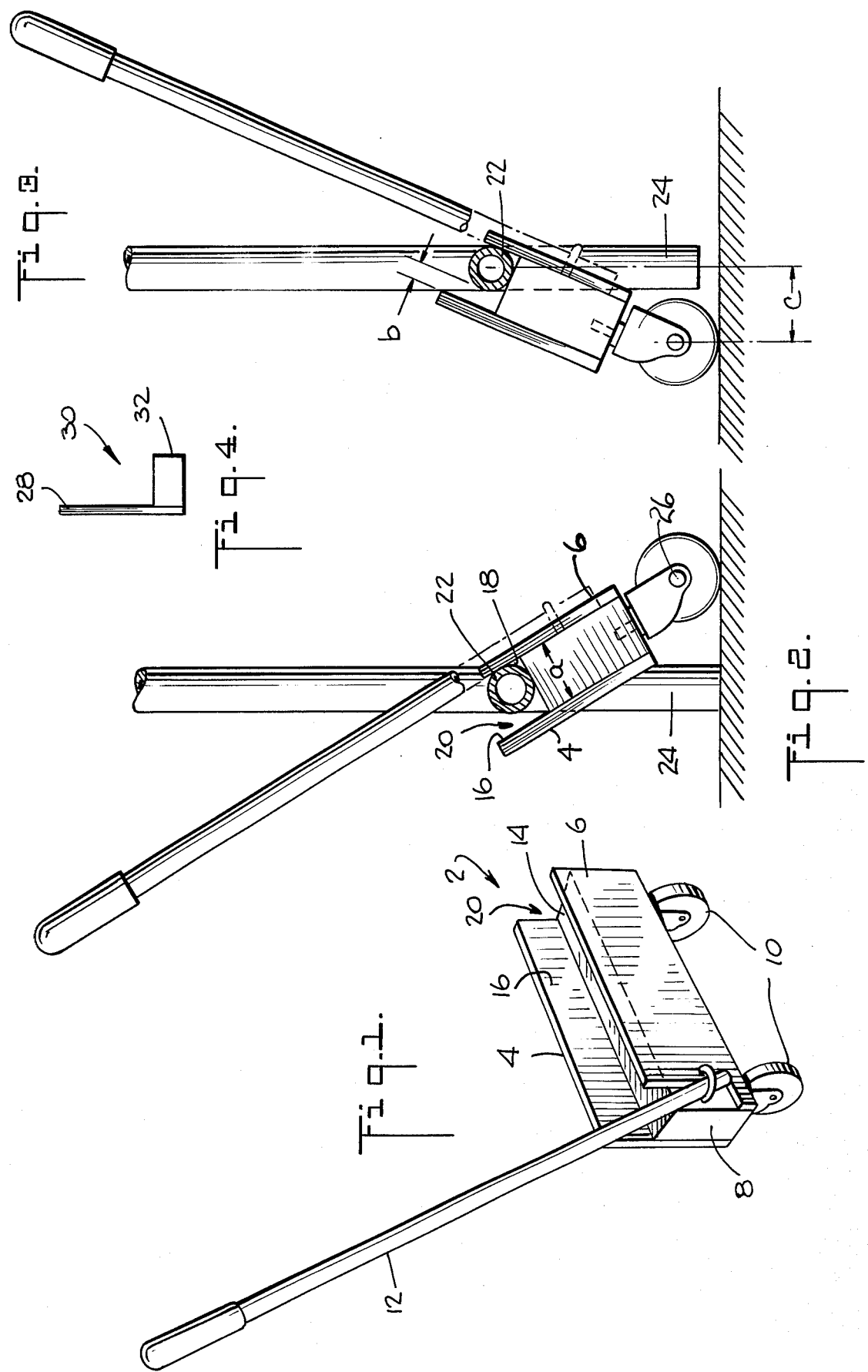

APPARATUS FOR FACILITATING MOVEMENT OF FURNITURE

FIELD OF THE INVENTION

The invention relates to furniture moving equipment. It has particular application in moving furniture with crosspieces attaching any two legs of the furniture.

BACKGROUND OF THE INVENTION

Description of the Prior Art

At present it is customary to move furniture manually. When large pieces must be moved, two or more people are needed to carry the piece.

Typical furniture which require two or more people to move the piece include luncheon tables and tables customarily found in all purpose meeting halls. The tables are usually six to ten feet long and require that a person lift each end and carry the table when it is to be moved.

SUMMARY OF THE INVENTION

The present invention is a wheeled device for facilitating movement of furniture and particularly tables by affording elevation of the legs of one end (or both if desired) of the table onto a wheeled structure.

The device is comprised of a channel member sized to accommodate a crosspiece between table legs or similar horizontal member. The channel is of a greater width than the horizontal member which fits into the channel.

The channel is defined by the lower surface on which the horizontal furniture member rests and two longitudinally extending vertical side members.

In operation, the channel surface is placed under the furniture horizontal member and the device is rotated around the horizontal member on the wheels to elevate a leg or legs of the furniture. As a result of the channel width being greater than the horizontal furniture piece the device will tilt so that the axis of the wheels is displaced from the axis of the horizontal piece resting in the channel.

Thus, the inner surface of each longitudinally extending vertical member bears against the respective opposite sides of any convenient vertically extending member on the furniture to hold the furniture piece in the elevated position.

The furniture piece, in the elevated position can be, rolled to another location by one person.

BRIEF DESCRIPTION OF THE DRAWINGS

FIG. 1 is a perspective view of the furniture moving device of this invention;

FIG. 2 is a side elevational view of the furniture moving device engaging a table by cross member prior to elevating the table leg;

FIG. 3 is the same side elevational view seen in FIG. 2, with the furniture moving device rotated to the operative position wherein the furniture legs have been elevated;

FIG. 4 is an elevational view of an adapter 20 which is a complement to the invention of FIGS. 1-3.

DESCRIPTION OF THE PREFERRED EMBODIMENT

The invention will be described with reference to furniture of the type typically found in all purpose rooms. For illustrative purposes the furniture referred to in explaining the device of the invention is a luncheon table. These tables are customarily six to ten feet in length and about three feet wide. They have two sets of tubular legs, one at each end. Each set of legs extends downwardly from the lower surface of the table and is provided with a horizontal cross member connecting the two legs of each set. The horizontal cross member is usually a short distance from the floor. The horizontal member connecting the two legs extends laterally beyond the vertical legs and then turns downwardly to provide two vertical members which terminate in ends which rest on the floor. The luncheon table is manufactured by Krueger Metal Products Co., Green Bay, Wisconsin, Adirondak Chair Co., Inc., 276 Park Avenue South, New York, N.Y., Business and Industrial Furniture, Inc., 611 North Broadway, Milwaukee, Wisconsin, and others.

The furniture moving device 2 of the present invention is comprised of a first vertical side 6 a second vertical side 4 a bottom body member 8 a wheel assembly 10 and a handle 12.

The bottom body member 8 has a top surface 14. The top surface 14 of the body member 8, and the inner surfaces 16 and 18 of the vertical side members 4 and 6 define a channel 20. The channel 20 is designed to accommodate a horizontal cross member of the furniture piece to be moved. The width $a$ of the channel is sized to be larger than the width of any horizontal furniture piece which it is intended to accommodate.

The wheel assembly 10 can be of any common type found on furniture. The wheels should be mounted for permanent alignment perpendicular to the axis of the channel 20. Casters have been tried and it has been found that they function awkwardly. The wheel location must be chosen to insure that when the furniture piece is elevated the wheel axis or the plane through which the force on the wheels is reacted is displaced from the horizontal axis or plane of the furniture horizontal piece being held in the channel 20. Thus, with the width of the channel 20 sized larger than the furniture piece to be accommodated by the channel 20, it will always be safe to locate the wheel axis (or wheel center) centrally along the bottom of the body 8 or anywhere between the center of the body 8 and the vertical side 4. As seen in FIGS. 2 and 3, the channel 20 is arranged to receive the horizontal crosspiece 22 which extends between the legs 24 of a table.

In operation, as best seen in FIGS. 2 and 3, the side 4 is rolled under the crosspiece 22 of the table so that the crosspiece 22 is in the channel 20 resting on the surface 14. The device 2 is then rotated around the crosspiece 22. A convenient means for rotating the device 2 is by use of the handle 12 which can be pulled to roll the wheels 10 under the crosspiece 22 and then rotated to thereby rotate the device 2 around the crosspiece 22. In practice, it has been found that the height of side 4 will determine the position of the handle 12 when the device 2 is rotated to the position wherein the furniture is effectively locked into an elevated position. For practical purposes it is desired that the handle be at a comfortable intermediate height and not too close to the floor.

The side 4 must be of sufficient height to prevent the device 2 from rotating so far around the horizontal member of the furniture piece or crosspiece 22 that side 6 is deflected at too great an angle to keep the crosspiece 22 from sliding out. The larger the allowance opening b, the higher the side 4 must be. On the other hand, the height and the vertical side 4 should not be too high or the device 2 will tend to become unstable in the operative positon. In the operative position, the device 2 is in a substantially locked position with the horizontal axis of the wheels and horizontal axis of the channel 20 on one side of the horizontal axis of the crosspiece 22 with the upper portion of side 6 on the other side of the horizontal axis of the crosspiece 22.

As shown in FIG. 3, after rotation of the device 2 around the crosspiece 22, the inside surface 16 of side member 4 bears against the leg(s) 24 to prevent further rotation. As a result of the larger width of the channel 20 compared to the crosspiece 22, the crosspiece 22 will rest in the corner of the channel 20 made by the surface 14 of the body member 8 and the surface 18 of the vertical side member 6. A small allowance opening b will exist between the crosspiece 22 and the inner surface 16 of the vertical side member 4.

Thus, the axis of the wheels 10 or wheel center 26 will be displaced from the horizontal axis of the cross member 22. The displacement is represented as c. This displacement effects a natural lock which prevents the device 2 from inadvertently rotating back around the crosspiece 22 as the table is rolled on the wheels 10.

In practice it has been found that a device 2 can move luncheon tables having 1⅛ inches O.D. crosspieces 22 located 6 inches to 7¼ inches from the bottom of the floor if sized as follows: 8¼ inches from wheel bottom to surface 14; 2½ inches from surface 14 to top edge of vertical side inside surface 16; 1½ inch - channel width; 3 inch - wheel diameter. The wheel axis (wheel center 26) in this embodiment is coincident with the horizontal axis of the body member 8.

FIG. 4 depicts an adapter 30 to fit within the channel 20 to allow operation of the furniture moving device when furniture with relatively high crosspieces must be moved. The adapter 30 has a side piece 28 which rest against surface 16 of side 4 and a bottom piece 32 which rests on the surface of the channel. Bottom piece 32 functions solely to elevate the bottom surface of the channel. Side piece 28 functions to provide side 4 and surface 16 with a higher edge to bear against the horizontal members of a table such as legs 24. It is vital to maintain the width of the channel 20 greater than the crosspiece 22 so that an allowance opening b is maintained.

The term "furniture" as used herein means any movable article such as tables, chairs, bedsteads, desks, cabinets, etc., required for use in a home, office or the like, and movable equipment such as factory equipment which, by its nature, has vertical legs and horizontal crosspieces.

The term "vehicular device" as used herein, means a conveyance moving on wheels, runners or the like, which transports articles.

I claim:

1. A vehicular device for moving a furniture piece having a fixed horizontally extending member and vertically extending means in essentially a vertical plane above the vehicular device comprising:
   a. a first vertical side sized to extend upwardly beyond the plane of the horizontal axis of the fixed horizontally extending member on the furniture piece;
   b. a second vertical side opposite the first vertical side extending upwardly to an elevation above the horizontal furniture piece such that rotation of the vehicular device around the horizontal member will cause the upper edge of the second vertical side to bear against the vertically extending means on the furniture piece in a vertical plane above the vehicular device;
   c. a flat bottom member;
   d. a horizontally extending channel defined by the flat bottom member, first side member and second side member, which channel has a width dimension at least one-third greater than the width of the fixed horizontally extending member on the furniture being moved;
   e. a wheel assembly with the wheels aligned to roll perpendicular to the horizontal axis of the channel;
   f. means to facilitate placing the horizontal channel into position to receive the horizontally extending member on the furniture piece and facilitate rotating the device around the horizontally extending member of the furniture piece by rolling the wheels of the wheel assembly from one side of the horizontally extending member of the furniture piece to the opposite side;
   g. whereby rotation of the device around the horizontally extending member of the furniture piece elevates one end of the furniture and the upper edge of the second side piece bears against the vertically extending means on the furniture piece to urge the horizontally extending member of the furniture piece against the inner surface of the first side and the vehicular device is at an angle such that the horizontal axis of the wheel assembly and channel are displaced to the side of the horizontal axis of the horizontally extending member of the furniture piece opposite of the first vertical side.

2. A vehicular device as in claim 1 wherein the means to facilitate placing the horizontal channel into position to receive the horizontal furniture piece and facilitate rotating the device around the horizontal member of the piece by rolling the wheels of the wheel assembly from one side of the horizontal piece to the opposite side is a handle extending from the vehicular device to a location outside the outline of the furniture piece.

3. A vehicular device as in claim 1 wherein the height of the second vertical side from the surface of the bottom member, width of the horizontal member of the furniture piece and channel width are in a ratio of approximately 2½: 1⅛: 1½.

* * * * *